US007666938B2

(12) United States Patent
Li et al.

(10) Patent No.: US 7,666,938 B2
(45) Date of Patent: *Feb. 23, 2010

(54) NANOPARTICLE SILICA FILLED BENZOXAZINE COMPOSITIONS

(75) Inventors: Wei Helen Li, San Ramon, CA (US); Stanley L. Lehmann, Martinez, CA (US); Raymond S. Wong, San Ramon, CA (US)

(73) Assignee: Henkel Corporation, Rocky Hill, CT (US)

( * ) Notice: Subject to any disclaimer, the term of this patent is extended or adjusted under 35 U.S.C. 154(b) by 333 days.

This patent is subject to a terminal disclaimer.

(21) Appl. No.: 11/004,566

(22) Filed: Dec. 3, 2004

(65) Prior Publication Data

US 2006/0240261 A1  Oct. 26, 2006

(51) Int. Cl.
*B60C 1/00* (2006.01)
*C08K 3/34* (2006.01)
*C08G 73/00* (2006.01)

(52) U.S. Cl. .................... 524/492; 524/493; 528/422; 528/423

(58) Field of Classification Search ............... 524/492, 524/493; 528/423, 422
See application file for complete search history.

(56) References Cited

U.S. PATENT DOCUMENTS

| | | | |
|---|---|---|---|
| 4,607,091 A | 8/1986 | Schreiber | 528/96 |
| 4,806,267 A | 2/1989 | Culbertson et al. | 252/182.23 |
| 5,021,484 A | 6/1991 | Schreiber et al. | 524/100 |
| 5,200,452 A | 4/1993 | Schreiber | 524/398 |
| 5,443,911 A | 8/1995 | Schreiber et al. | 428/413 |
| 5,543,516 A | 8/1996 | Ishida | 544/69 |
| 6,207,786 B1 | 3/2001 | Ishida et al. | 528/94 |
| 6,323,270 B1 | 11/2001 | Ishida et al. | 524/445 |
| 6,376,080 B1 * | 4/2002 | Gallo | 428/413 |
| 6,429,157 B1 * | 8/2002 | Kishi et al. | 442/227 |
| 6,534,179 B2 | 3/2003 | Japp et al. | 428/413 |
| 6,620,905 B1 * | 9/2003 | Musa | 528/423 |
| 6,632,511 B2 * | 10/2003 | Zhang | 428/209 |
| 6,982,236 B2 * | 1/2006 | Wenzel et al. | 502/117 |
| 2003/0018131 A1 | 1/2003 | Davis et al. | 525/107 |
| 2003/0023007 A1 * | 1/2003 | Reardon | 525/430 |
| 2004/0170554 A1 * | 9/2004 | Wadahara et al. | 423/447.2 |
| 2004/0216838 A1 * | 11/2004 | Ekman et al. | 156/307.3 |
| 2007/0129509 A1 * | 6/2007 | Li et al. | 525/526 |

FOREIGN PATENT DOCUMENTS

| | | |
|---|---|---|
| CN | 9411852.5 | 10/2000 |
| EP | 0 518 060 A2 | 5/1992 |
| EP | 0 323 142 B1 | 9/1993 |
| EP | 1 408 152 | 4/2004 |
| EP | 1 415 782 | 6/2004 |
| JP | 06 345898 | 12/1994 |
| JP | 10 3010678 | 11/1998 |
| JP | 1259830 | 6/1999 |
| JP | 2000 273291 | 10/2000 |
| JP | 2003 082117 | 3/2003 |
| WO | WO 03/013820 | 2/2003 |
| WO | WO 03/072638 | 9/2003 |
| WO | WO 2005/000955 | 1/2005 |

OTHER PUBLICATIONS

S. Rimdusit and H. Ishida, "Development of New Class of Electronic Packaging Materials Based on Ternary System of Benzoxazine, Epoxy, and Phenolic Resin," Polymer, 41, 7941-49 (2000).
H. Ishida and D. Allen, "Mechanical Characterization of Copolymers based on Benzoxamine and Epoxy", Polymer, vol. 37, No. 20, pp. 4487-4495 (1996).
H. Ishida and Y. Rodriguez, "Curing Kinetics of a New Benzoxazine-Based Phenolic Resin by Differential Scanning Calorimetry", Polymer, vol. 36, No. 16, pp. 3151-3158 (1995).
H. Kim and H. Ishida, "A Study on Hydrogen-Bonded Network Structure of Polybenzoxazines" J. Phys. Chem. A 106, pp. 3271-3280 (2002).
X. Liu and Y. Gu, "Study on the Volumetric Expansion of Benzoxazine Curing with Different Catalysts", J. Appl. Sci., vol. 84, pp. 1107-1113 (2001).
S. Rimdusit and H. Ishida, "Gelation Study of High Processability and High Reliability Ternary Systems based on Benzoxazine, Epoxy, and Phenolic Resins for an Application as Electronic Packaging Materials", Rheol Acta 41, pp. 1-9 (2002).
H. Kim, H. Ishida, "Study on the Chemical Stability of Benzoxazine-Based Phenolic Resins in Carboxylic Acids", J. Appl. Polym. Sci., vol. 79, pp. 1207-1219 (2001).
H. Ishida, D. J. Allen, "Gelation Behavior of Near-Zero Shrinkage Polybenzoxazines", J. Appl. Polym. Sci., vol. 79, 406-417 (2001).
H. Ishida, D.P. Sanders, "Improved Thermal and Mechanical Properties of Polybenzoxazines Based on Alkyl-Substituted Aromatic Amines", J. Polym. Sci.: Part B, vol. 38, pp. 3289-3301 (2000).
H. Ishida, D.P.Sanders, "Regioselectivity and Network Structure of Difunctional Alkyl-Substituted Aromatic Amine-Based Polybenzoxazines", Macromolecules, 33, 8149-8157 (2000).
S. B. Shen and H. Ishida, "Dynamic Mechanical and Thermal Characterization of High-Performance Polybenzoxazines", J. Polym. Sci.: Part B Polym. Phy., vol. 37, 3257-3268 (1999).
S. Rimdusit and H. Ishida, "Synergism and Multiple Mechanical Relaxations Observed in Ternary Systems Based on Benzoxazine, Epoxy, and Phenlic Resins", J. Polym. Sci: Part B: Polym. Phy., vol. 38, 1687-1698 (2000).
J. Dunkers, H. Ishida, "Reaction of Benzoxazine-based Phenolic Resins with Strong and Weak carbonylic Acids and Phenols as Catalysts", J. Polym. Sci.: Part A: Polym. Chem., vol. 37, 1913-1921 (1999).
X. Zhang, A. C. Potter and D. H. Solomon, "The Chemistry of Novolac Resins—V. Reactions of Benzoxazine Intermediates", Polymer, vol. 39, 399-404 (1998).
X. Zhang and D. H. Solomon, "The Chemistry of Novolac Resins—VI. Reactions Between Benzoxazine Intermediates and Model Phenols", Polymer, vol. 39, No. 2, pp. 405-412 (1998).

(Continued)

*Primary Examiner*—Nathan M Nutter
(74) *Attorney, Agent, or Firm*—Steven C. Bauman

(57) ABSTRACT

Curable compositions, such as benzoxazine-based ones, are useful in applications within the aerospace industry, such as for example as a heat curable composition for use as a matrix resin or an adhesive, and form the basis of the present invention.

19 Claims, No Drawings

OTHER PUBLICATIONS

Y. Wang and H. Ishida, "Devolopment of Low-Viscosity Benzoxazine Resins and Their Polymers", J. Appl. Polym. Sci., vol. 86, pp. 2953-2966 (2002).

K. Hemvichian and H. Ishida, Thermal Decomposition Processes in Aromatic Amine-Based Polybenzoxazines Investigated by TGA and GC-MS, Polymer, vol. 43, pp. 4391-4402 (2002).

B.M. Culbertson, "Cyclic Imino Ethers in Step-Growth Polymerizations", Prog. Polym. Sci., Article in Press (2001).

H. Kimura, S. Taguchi, A. Matsumoto, "Studies on New Type of Phenolic Resin (IX) Curing Reaction of Bisphenol A-Based Benzoxazine with Bisoxazoline and the Properties of the Cured Resin. II. Cure Reactivity of Benzoxazoline", J. Appl. Polym. Sci., vol. 79, 2331-2339 (2001).

P. Chutayothin, H. Ishida, and S. Rowan, "Cationic Ring-Opening Polymerization of Monofunctional Benzoxazine", Polymer Reprints, 42(2), pp. 599-600,621-622 (2001).

T. Agag and T. Takeichi, "Novel Benzoxazine Monomers Containing p-Phenyl Propargyl Ether: Polymerization of Monomers and Properties of Polybenzoxazines", Macromolecules, 34, pp. 7257-7263 (2001).

H. Kimura, et al., "New Thermosetting Resin from Poly(p-vinylphenol) Based Benzoxazine and Epoly Resin", J. Appl. Polym. Sci, vol. 79, 555-565 (2001).

A. S. C. Lim, et al., "Chemistry of Novolac Resins. X. Polymerization Studies of HMTA and Strategically Synthesized Model Compounds", J. of Polym. Sci.: Part A: Polym. Chem., vol. 37, 1347-1355 (1999).

H. Y. Low and H. Ishida, "Mechanistic Study on the Thermal Decomposition of Polybenzoxazines: Effects of Aliphatic Amines", J. of Polym. Sci.: Part B: Polym. Phy., vol. 36, pp. 1935-1946 (1998).

H. Kimura, et al., "Epoxy Resin Cured by Bisphenol A. Based Benzoxazine", J. of Appl. Polym. Sci., vol. 68, 1903-1910 (1998).

J. E. McGrath, et al., "Syntheses and Characterizatio of Segmented Polyimide-Polyorganosiloxane Copolymers", Adv. in Polym. Sci., vol. 140, pp. 61-105 (1999).

ULTEM 2000 (CAS Reg. No. 61128-46-9) (2003).

W. J. Burke, et al., "A new Aminoalkylation Reaction. Condensation of Phenols with Dihydro-1, 3-Aroxazines", J. Org. Chem., vol. 30(10), pp. 3423-3427 (1965).

J. Jang and D. Seo, "Performance Improvement of Rubber-Modified Polybenzoxazine", J. Appl. Polym. Sci., vol. 67, pp. 1-10 (1998).

Raymond A. Pearson, "Toughening Epoxies Using Rigid Thermoplastic Particles", American Chemical Society, pp. 405-425 (1993).

J. Jang, et al. "Toughness Improvement of Carbon-Fibre/ Polybenzoxazine Composites by Rubber Modification", *Composites Sci. and Tech.*, 60, No. 3, 457-463 (2000).

Lee, Y-J, et al., "Syntheses, Thermal Property, and Phase Morphologies of Novel Benzoxazines Functionalized with Polyhedral Oligomeric Silsesquioxane (POSS) Nanocomposites", Polym. Elsevier Sci. Publishers B.V., GB, vol. 45, No. 18, pp. 6321-6631 (Aug. 19, 2004).

N. Dansiri, et al., "Resin Transfer Molding of Natural Fiber Reinforced Polybenzoxazine Composites", *J. Soc. of Plast. Engs.*, 23(3), (2002).

Y. Gu, et al., "New Matrix based on Benzoxazine for Resin Transfer Molding (RTM and their Composites", *Fuhe Cailiao Xuebao*, 17(4), (2000) (English-Language Translation of Abstract).

* cited by examiner

NANOPARTICLE SILICA FILLED BENZOXAZINE COMPOSITIONS

BACKGROUND OF THE INVENTION

1. Field of the Invention

Curable compositions, such as benzoxazine-based ones, are useful in applications within the aerospace industry, such as for example as a heat curable composition for use as a matrix resin or an adhesive, and form the basis of the present invention, in which the curable composition is filled with silica having a mean particle diameter on the order of $10^{-9}$ meters.

2. Brief Description of Related Technology

Epoxy resins with various hardeners have been used extensively in the aerospace and electronics industries both as adhesives and as matrix resins for use in prepreg assembly with a variety of substrates.

Benzoxazines themselves have been reported in the literature as generally having a high glass transition temperature, good electrical properties (e.g., dielectric constant), and low flammability.

Blends of epoxy resins and benzoxazines are known. See e.g. U.S. Pat. Nos. 4,607,091 (Schreiber), 5,021,484 (Schreiber), 5,200,452 (Schreiber), and 5,445,911 (Schreiber). These blends appear to be potentially useful in the electronics industry, as the epoxy resins can reduce the melt viscosity of benzoxazines allowing for the use of higher filler loading while maintaining a processable viscosity. However, epoxy resins oftentimes undesirably increase the temperature at which benzoxazines polymerize.

Ternary blends of epoxy resins, benzoxazine and phenolic resins are also known. See U.S. Pat. No. 6,207,786 (Ishida), and S. Rimdusit and H. Ishida, "Development of new class of electronic packaging materials based on ternary system of benzoxazine, epoxy, and phenolic resin," *Polymer,* 41, 7941-49 (2000).

U.S. Pat. No. 6,323,270 (Ishida) speaks to and claims a nanocomposite composition of clay and a benzoxazine monomer, oligomer, and/or polymer in amount effective to form a nanocomposite. The clay is described as a silicate comprised of multiple platelets, or a hydrated aluminum silicate comprised of multiple platelets. Clay, reads the '270 patent, is a component of soils typically derived from the weathering of rocks that can be an aggregate having particle sizes of less than about 200 microns, such as less than about 100 microns, like less than about 50 microns, examples of which being montmorillonite, atapulgite, illite, bentonite, and halloysite.

Notwithstanding the state of the technology, there has been no disclosure, teaching or suggestion to prepare a heat curable composition based on the combination of a benzoxazine and silica having a mean particle diameter on the order of $10^{-9}$ meters, let alone one with improved performance properties.

SUMMARY OF THE INVENTION

The inventive compositions are heat curable and include the combination of a benzoxazine component and a silica component, where the silica has a mean particle diameter on the order of $10^{-9}$ meters.

In one aspect, the invention provides a benzoxazine component comprising

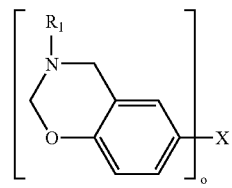

where o is 1-4, X is a direct bond (when o is 2), alkyl (when o is 1), alkylene (when o is 2-4), carbonyl (when o is 2), thiol (when o is 1), thioether (when o is 2), sulfoxide (when o is 2), or sulfone (when o is 2), and $R_1$, is alkyl, such as methyl, ethyl, propyls and butyls, or aryl, or

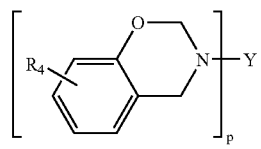

where p is 1-4, Y is selected from biphenyl (when p is 2), diphenyl methane (when p is 2) and derivatives thereof, diphenyl isopropane (when p is 2), diphenyl sulfide (when p is 2), diphenyl sulfoxide (when p is 2), diphenyl sulfone (when p is 2), or diphenyl ketone (when p is 2), and $R_4$ is selected from hydrogen, halogen, alkyl or alkenyl; and a silica component having a mean particle diameter on the order of $10^{-9}$ meters.

In a more specific embodiment of that aspect of the invention, the benzoxazine component is embraced by one or more of

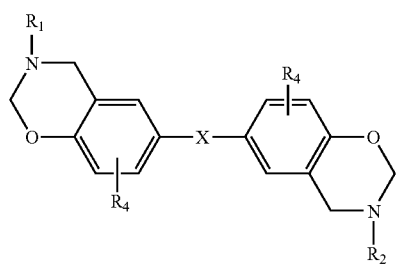

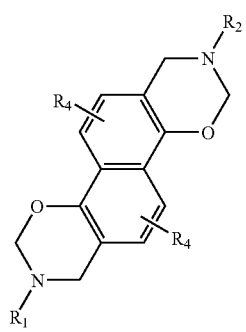

3

-continued

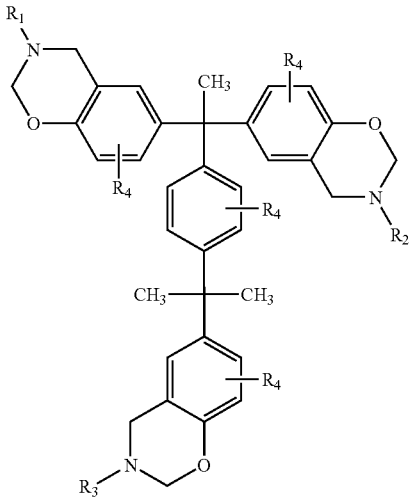

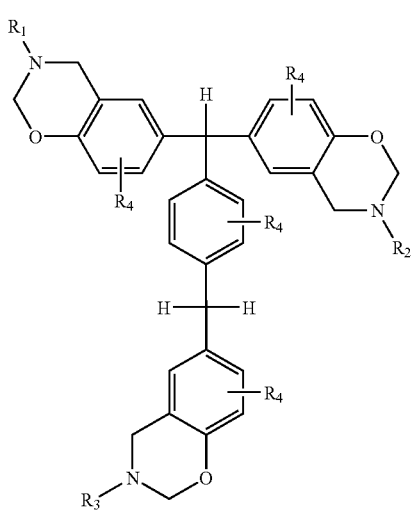

where X is selected from a direct bond, $CH_2$, $C(CH_3)_2$, $C=O$, S, $S=O$ or $O=S=O$, and $R_1$, $R_2$, and $R_3$ are the same or different and are selected from alkyl, such as methyl, ethyl, propyls and butyls, alkenyl, such as allyl, or aryl, and $R_4$ is selected from hydrogen, halogen, alkyl, or alkenyl.

Cured reaction products of the inventive compositions are capable of demonstrating at least one of improved modulus and toughness, without appreciable loss in Hot/Wet glass transition temperature.

DETAILED DESCRIPTION OF THE INVENTION

As noted above, the present invention provides generally a heat curable composition comprising the combination of a benzoxazine component and a silica component having a mean particle diameter on the order of $10^{-9}$ meters.

4

In one aspect, the invention provides a benzoxazine component comprising

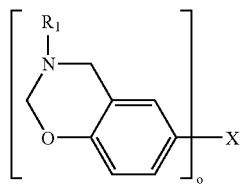

where o is 1-4, X is a direct bond (when o is 2), alkyl (when o is 1), alkylene (when o is 2-4), carbonyl (when o is 2), thiol (when o is 1), thioether (when o is 2), sulfoxide (when o is 2), or sulfone (when o is 2), and $R_1$ is alkyl, such as methyl, ethyl, propyls and butyls, or aryl, or

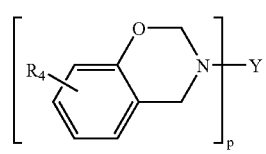

where p is 1-4, Y is selected from biphenyl (when p is 2), diphenyl methane (when p is 2) and derivatives thereof, diphenyl isopropane (when p is 2), diphenyl sulfide (when p is 2), diphenyl sulfoxide (when p is 2), diphenyl sulfone (when p is 2), or diphenyl ketone (when p is 2), and $R_4$ is selected from hydrogen, halogen, alkyl or alkenyl; and a silica component having a mean particle diameter on the order of $10^{-9}$ meters.

In a more specific embodiment of that aspect of the invention, the benzoxazine component is embraced by

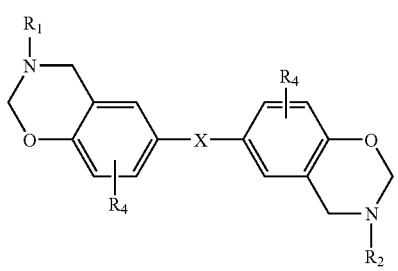

where X is selected from a direct bond, $CH_2$, $C(CH_3)_2$, $C=O$, S, $S=O$ or $O=S=O$, $R_1$ and $R_2$ are the same or different and are selected from hydrogen, alkyl, such as methyl, ethyl, propyls and butyls, alkenyl, such as allyl, or aryl, and $R_4$ is selected from hydrogen, halogen, alkyl or alkenyl.

Representative benzoxazines include:
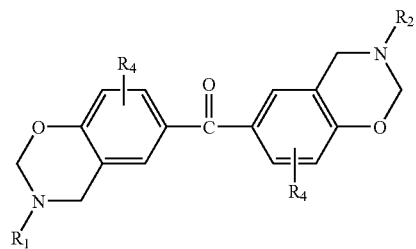
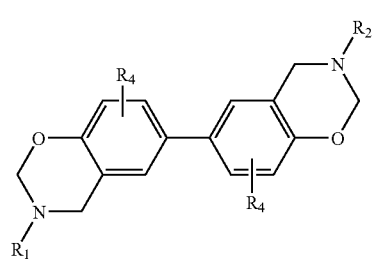
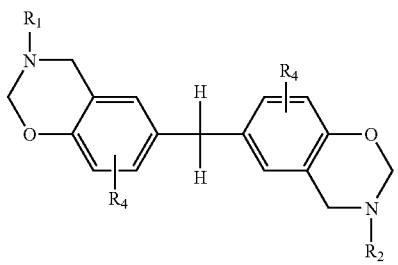
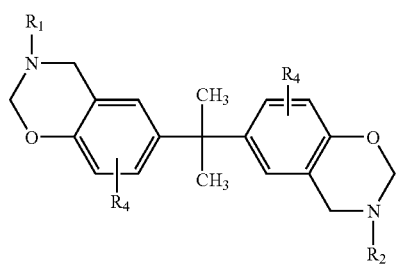
where $R_1$, $R_2$ and $R_4$ are as defined above.
Examples of these benzoxazines therefore include:
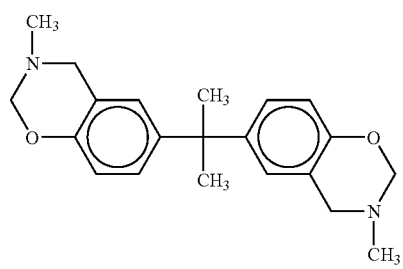
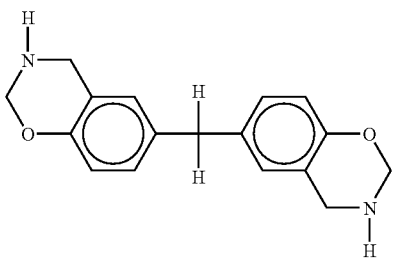
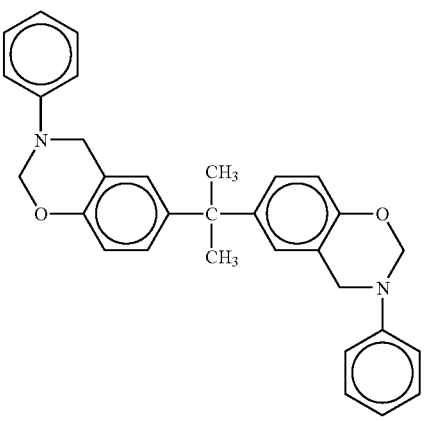
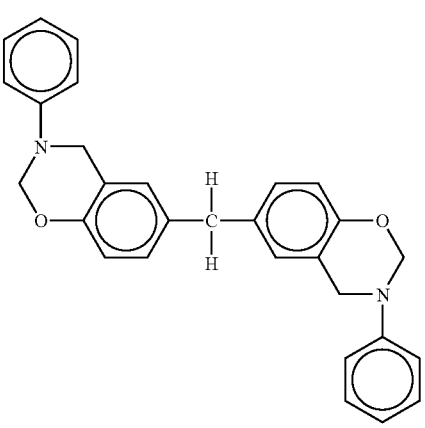
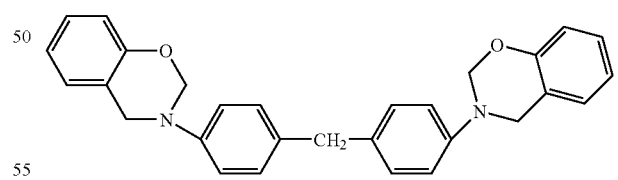
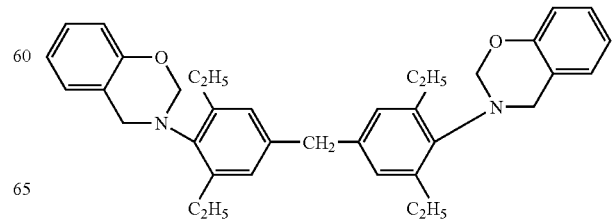

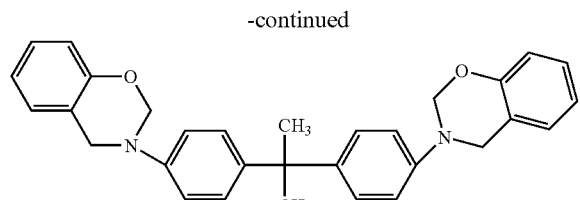

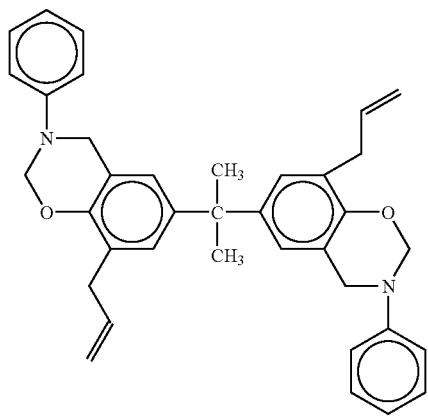

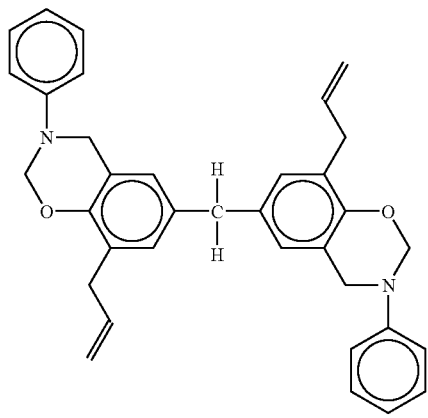

Though not embraced by structures I or II, additional following structures:

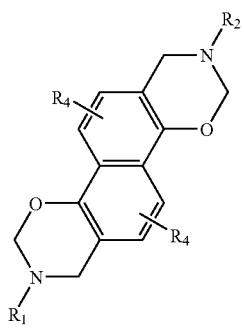

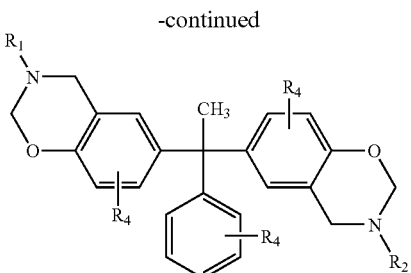

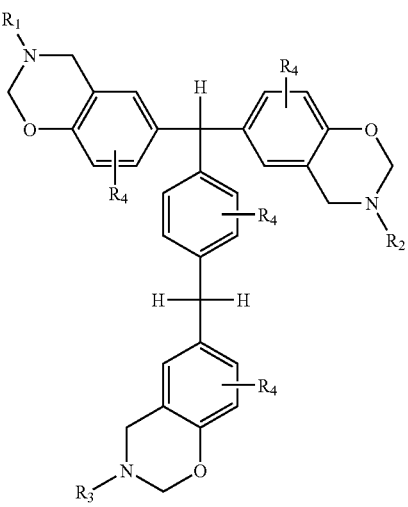

where $R_1$, $R_2$ and $R_4$ are as defined above, and $R_3$ is defined as $R_1$, $R_2$ or $R_4$.

The benzoxazine component may include the combination of multifunctional benzoxazines and monofunctional benzoxazines. Examples of monofunctional benzoxazines may be embraced by the following structure:

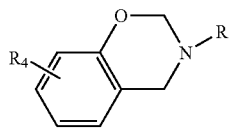

where R is alkyl, such as methyl, ethyl, propyls and butyls, or aryl, and $R_4$ is selected from hydrogen, halogen, alkyl and alkenyl.

Examples of such a monofunctional benzoxazine are:

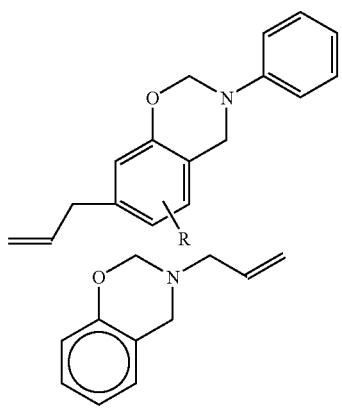

where R is alkyl, or aryl

Cured reaction products of the inventive compositions are capable of demonstrating at least one of improved modulus and toughness, without appreciable loss in Hot/Wet glass transition temperature, as is seen in the Examples.

The benzoxazine component should be present in an amount in the range of about 10 to about 99 percent by weight, such as about 25 to about 75 percent by weight, desirably about 35 to about 65 percent by weight, based on the total weight of the composition.

The silica component should have a mean particle diameter on the nanoparticle size; that is, having a mean particle diameter on the order of $10^{-9}$ meters. The silica nanoparticles can be pre-dispersed in epoxy resins, and may be selected from those commercially available under the trade name NANOPOX, from Hanse Chemie, Germany. NANOPOX is a trade name for a product family of silica nanoparticle reinforced epoxy resins showing an outstanding combination of material properties. The silica phase consists of surface-modified, synthetic $SiO_2$ nanospheres with less than 50 nm diameter and an extremely narrow particle size distribution. The $SiO_2$ nanospheres are agglomerate-free dispersions in the epoxy resin matrix resulting in a low viscosity for resins containing up to 50 wt % silica.

Commercially available examples of the NANOPOX products include NANOPOX XP 0314 (a cycloaliphatic epoxy resin matrix), XP 0516 (a bisphenol A epoxy resin matrix), and XP 0525 (a bisphenol F epoxy resin matrix). These NANOPOX products are silica nanoparticle dispersions in the noted epoxy resins, at a level of up to about 50% by weight, though the manufacturer reports 40% by weight for the three noted products. These NANOPOX products are believed to have a particle size of about 5 nm to about 80 nm, though the manufacturer reports less than 50 nm.

The silica component of the present invention should be present in an amount in the range of about 1 to about 60 percent by weight, such as about 3 to about 30 percent by weight, desirably about 5 to about 20 percent by weight, based on the total weight of the composition.

The benzoxazine component of the present invention may typically be prepared by reacting a phenolic compound, such as a bisphenol A, bisphenol F, bisphenol S or thiodiphenol, with an aldehyde and an alkyl amine. U.S. Pat. No. 5,543,516, hereby expressly incorporated herein by reference, describes a method of forming benzoxazines, where the reaction time can vary from a few minutes to a few hours, depending on reactant concentration, reactivity and temperature. See also Burke et al., *J. Org. Chem.*, 30(10), 3423 (1965); see generally U.S. Pat. No. 4,607,091 (Schreiber), U.S. Pat. No. 5,021,484 (Schreiber), U.S. Pat. No. 5,200,452 (Schreiber) and U.S. Pat. No. 5,443,911 (Schreiber).

Benzoxazines are presently available from several sources commercially, including Vantico, Inc., Brewster, N.Y., Georgia-Pacific Resins, Inc. and Shikoku Chemicals Corporation, Chiba, Japan, the last of which offers among others B-a, B-m, F-a, C-a and F-a benzoxazine resins. Of these, the benzoxazine component of the present invention is oftentimes desirably within the B-m benzoxazine resin family.

Benzoxazine polymerization can also be initiated by cationic initiators, such as Lewis acids, and other known cationic initiators, such as metal halides; organometallic derivatives; metallophorphyrin compounds such as aluminum phthalocyanine chloride; methyl tosylate, methyl triflate, and triflic acid; oxyhalides; and bases, such as imidazoles.

The inventive compositions may also include coreactants, curatives and/or catalysts for the benzoxazines component. Examples include Lewis acids, such as phenols and derivatives thereof, strong acids, such as alkylenic acids, cationic catalysts, and as noted above, bases, such as imidazoles.

The inventive compositions may also include a toughener component, examples of which include poly(phenylene) oxide; PES 5003P. available commercially from Sumitomo Chemical Company, Japan, which contains the structure represented below

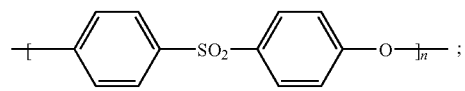

acrylonitrile-butadiene co-polymer having secondary amine terminal groups ("ATBN"), core shell polymers, such as PS 1700, available commercially from Union Carbide Corporation, Danbury, Connecticut; and BLENDEX 338, SILTEM STM 1500 and ULTEM 2000, which are available commercially from General Electric Company. ULTEM 2000 (CAS Reg. No. 61128-46-9) is a polyetherimide having a molecular weight ("Mw") of about 30,000±10,000.

The inventive composition may be in the form of an adhesive, in which case one or more of an adhesion promoter, a flame retardant, a filler, a thermoplastic additive, a reactive or non-reactive diluent, and a thixotrope may be included. In addition, the inventive adhesive may be placed in film form, in which case a support constructed from nylon, qlass, carbon, polyester, polyalkylene, quartz, polybenzimidazole, polyetheretherketone, polyphenylene sulfide, poly p-phenylene benzobisoxazole, silicon carbide, phenolformaldehyde, phthalate and naphthenoate should be included.

The invention also provides cured reaction products of the adhesives.

The invention also provides the adhesive in the form of a film, in which case the film may further include a support therefor selected from nylon, glass, carbon, polyester, polyalkylene, quartz, polybenzimidazole, polyetheretherketone, polyphenylene sulfide, poly p-phenylene benzobisoxazole, silicon carbide, phenolformaldehyde, phthalate and napthenoate.

Of course, the invention provides cured reaction products of the adhesive film.

Compositions of the present invention may ordinarily be cured by heating to a temperature in the range of about 120 to about 180° C. for a period of time of about 30 minutes to 4 hours. Thus, the inventive compositions can be used at relatively moderate temperatures to achieve very good productivity.

The inventive composition may also be used to form syntactic materials, as are known such as for instance from U.S. Pat. No. 5,665,461 (Wong), the disclosure of which is hereby incorporated herein by reference.

The invention also provides a process for producing the inventive heat curable composition. The steps of this process includes:

(a) providing a benzoxazine comprising

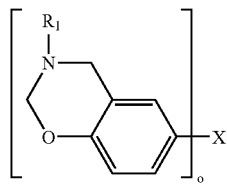

where o, X and $R_1$ are as defined above, or

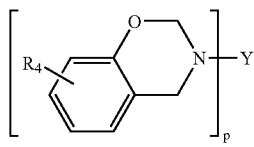

where p, Y and $R_4$ are as defined above;

(b) providing with mixing a silica component having a mean particle diameter on the order of $10^{-9}$ meters; and (c) mixing the benzoxazine and the silica component under conditions appropriate to produce the heat curable composition.

The invention also relates to prepregs, and processes for producing prepregs, from the inventive composition. One such process includes the steps of (a) providing a layer of fibers; (b) providing the inventive inventive composition; and (c) joining the inventive composition and the layer of fibers to form a prepreg assembly, and exposing the resulting prepreg assembly to elevated temperature and pressure conditions sufficient to infuse the layer of fibers with the inventive composition to form a prepreg.

Another such process for producing a prepreg, includes the steps of (a) providing a layer of fibers; (b) providing the inventive composition in liquid form; (c) passing the layer of fibers through the liquid inventive composition to infuse the layer of fibers with the inventive composition; and (d) removing excess inventive composition from the prepreg assembly.

The fiber layer may be constructed from unidirectional fibers, woven fibers, chopped fibers, non-woven fibers or long, discontinuous fibers.

The fiber chosen may be selected from carbon, glass, aramid, boron, polyalkylene, quartz, polybenzimidazole, polyetheretherketone, polyphenylene sulfide, poly p-phenylene benzobisoxazole, silicon carbide, phenolformaldehyde, phthalate and napthenoate.

The carbon is selected from polyacrylonitrile, pitch and acrylic, and the glass is selected from S glass, S2 glass, E glass, R glass, A glass, AR glass, C glass, D glass, ECR glass, glass filament, staple glass, T glass and zirconium oxide glass.

The invention further relates to towpregs formed from a bundle of such fibers infused with the inventive composition, and processes for producing a towpreg. In one such process, the steps include (a) providing a bundle of fibers; (b) providing the inventive composition and (c) joining the inventive composition and the bundle of fibers to form a towpreg assembly, and exposing the resulting towpreg assembly to elevated temperature and pressure conditions sufficient to impregnate the bundle of fibers with the inventive composition to form a towpreg.

In another such process, the steps include (a) providing a bundle of fibers; (b) providing the inventive composition in liquid form; (c) passing the bundle of fibers through the liquid inventive composition to impregnate the bundle of fibers with the inventive composition; and (d) removing excess inventive composition from the towpreg assembly, thereby forming the towpreg.

The inventive compositions (and pregregs and towpregs prepared therefrom) are particularly useful in the manufacture and assembly of composite parts for aerospace and industrial end uses, bonding of composite and metal parts, core and core-fill for sandwich structures and composite surfacing.

The inventive compositions are also useful in advanced processes, such as resin transfer molding ("RTM"), vacuum assisted resin transfer molding ("VaRTM") and resin film infusion ("RFI"). See U.S. patent application Ser. No. 10/642,325, the disclosure of which is incorporated herein by reference.

This invention is further illustrated by the following representative examples.

EXAMPLES

In a first example, the following components were used to prepare Sample Nos. 1-5 as noted in Table 1.

TABLE 1

| | Sample No./Amt. (wt. %) | | | | |
|---|---|---|---|---|---|
| Components | 1 | 2 | 3 | 4 | 5 |
| B-m type Benzoxazine | 90 | 85 | 78 | 75 | 65 |
| ATBN 1300x16 | 10 | 15 | 14 | — | 10 |
| Cycloaliphatic Epoxy | — | — | 8 | 15 | 15 |
| Silica Nanoparticles* | — | — | — | 10 | 10 |

*Silica nanoparticle reinforced epoxy resins, commercially available from Hanse Chemie.

Each of the samples was prepared as follows:

The benzoxazine was warmed at a temperature in the range of 180-200° F. to render it flowable, without initiating curing.

Where the NANOPOX XP 0314 silica nanoparticles were present, the benzoxazine was mixed therewith at a temperature of 180° F. until a homogeneous mixture was formed.

Where ATBN was present, the ATBN was mixed into the mixture at a temperature in the range of 160-180° F.

The composition so formed was mixed under a vacuum, at a temperature in the range of 160-180° F. for a period of time of 15-30 minutes. The so formed composition was stored in a closed container at room temperature.

The samples noted in Table 1 may be cured in an open face mold placed in an autoclave using the following cure profile:

The samples were exposed to 90 psi pressure within the autoclave and the temperature therein was increased at a 5° F./min ramp rate to a temperature of 350° F., for a period of time of about 3 hours. The cured samples were then cooled to a temperature of about 90° F. in the mold at a 5° F./min ramp rate for a period of time of about 1 hour before use or evaluation.

The samples were cured and evaluated for property performance, results of which are shown below in Table 2.

TABLE 2

|  | Sample No. | | | | |
| --- | --- | --- | --- | --- | --- |
| Physical Properties | 1 | 2 | 3 | 4 | 5 |
| ΔH, J/g | −173 | −168 | −337 | −308 | −292 |
| Cured density, g/cc | 1.10 | 1.09 | 1.11 | 1.19 | 1.19 |
| $T_g$, ° F. | 370 | 387 | 367 | 385 | 365 |
| Hot/Wet $T_g$, ° F. | 360 | 374 | 351 | 361 | 352 |
| Moisture uptake, % | 1.1 | 1.5 | 1.7 | 2.0 | 2.7 |
| Flexure modulus, msi | 0.54 | 0.49 | 0.44 | 0.83 | 0.58 |
| $K_{1C}$, ksi-in$^{1/2}$ | 1.2 | 1.3 | 1.3 | 0.8 | 1.2 |

Uncured samples were evaluated by Differential Scanning Calorimetry ("DSC"), within a temperature range of 40-350° C., where the temperature range increased at a 20° C./min ramp rate, and from which ΔH was recorded.

The cured samples were evaluated using the following property tests:

Density was measured according to ASTM D 792, and cure shrinkage was then calculated.

Dynamic mechanical thermal analysis ("DMTA") was performed on cured samples using a double cantilever fixture. The cured samples were isothermally equilibrated at a temperature of 40° C. in an oven and the temperature was increased at a 5° C./min ramp rate to a temperature of 250° C. Tg values were obtained from this DMTA evaluation from onset G', storage shear modulus.

The cured samples were also subjected to boiling water for 3 days, and weight gain was recorded. Tg values were obtained from these samples using a DMTA evaluation.

Flexure modulus was determined in accordance with ASTM D 790, using cured samples with the following specimen dimensions: 0.125×0.5×4 in., span 2 in., test speed: 0.05 in./min. $K_{1C}$ was determined in accordance with ASTM D5045, single-edge-notch bending (SENB), using cured specimens with dimensions: 0.15×0.5×3 in., span 2 in., test speed 0.5 in/min.

The advantages of using silica nanoparticles, for example, NANOPOX XP 0314 include increasing the modulus and improving toughness of the cured composition, without compromising Tg and Hot/Wet Tg. In addition, the use of silica nanoparticles (contrasted with larger silica particles) allows for the inclusion of such silica nanoparticles in the composition even after filtration processes (oftentimes used n connection with prepreg or RTM), which would otherwise trap such larger particles.

For compositions prepared with B-m type benzoxazines and ATBN, good toughness along with high Tg (dry and Hot/Wet) are observed. However, as the amount of ATBN is increased, the modulus was observed to decrease (see e.g. Sample Nos. 1 and 2). By the addition of silica nanoparticle reinforced epoxy resin, for example, NANOPOX XP 0314, the modulus was improved without adversely impacting Tg. Therefore, by including a toughener, such as ATBN, together with silica nanoparticles, such as NANOPOX XP 0314, a benzoxazine-containing heat curable composition may be prepared having good toughness, high Tg and by adjusting the amounts of the various components a modulus range from low to high. Low modulus compositions are desirable generally for adhesive applications, while high modulus compositions can meet specifications oftentimes called for in high performance materials like prepregs or towpregs.

In a second example, Sample Nos. 6-7 were formulated from the components listed and amounts noted in Table 3.

These samples were used to make carbon fiber reinforced laminates. The so-prepared laminates were cured in an autoclave for 2 hours at 365° F. with a 3° F./min heat-up (to the 365° F. temperature) and 100 psi.

TABLE 3

|  | Sample No./Amt. (wt %) | |
| --- | --- | --- |
| Components | 6 | 7 |
| Bisphenol F/thiodiphenol benzoxazine* | 68 | 65 |
| ATBN | 10 | 10 |
| Cycloaliphatic Epoxy | 22 | 15 |
| Silica Nanoparticles | — | 10 |

*available commercially from Vantico.

In Table 4 below, flexure modulus has been reported for Sample Nos. 6-7. Sample No. 7 (with silica nanoparticles) was determined to have higher modulus.

TABLE 4

|  | Sample No. | |
| --- | --- | --- |
| Physical Property | 6 | 7 |
| Flexure modulus, msi | 0.50 | 0.62 |

The laminates were cut into 4×6 in. specimens, and impacted in accordance with Boeing test method BSS 7260 Type II (plate compression after impact). The impact energy was 270 in-lb. The damage area was determined by C-Scan.

A laminate made with Sample No. 6 was determined to have a large damage area of 2.5 in$^2$, while a laminate made with Sample No. 7 was determined to have a smaller damage area of 0.7 in$^2$. This indicated that the presence of silica nanoparticles helped to decrease the impact damage area which is critical to composite applications.

Next, Sample Nos. 8-11 were prepared using Bm-type benzoxazine and, where noted, ATBN and/or a silica nanoparticle inorganic filler.

TABLE 5

|  | Sample No./Amt. (parts) | | | |
| --- | --- | --- | --- | --- |
| Components | 8 | 9 | 10 | 11 |
| B-m type Benzoxazine | 85 | 70 | 65 | 75 |
| ATBN | 15 | 30 | 10 | — |
| XP 0314* | — | — | 25 | 25 |

*Silica nanoparticle reinforced epoxy resins, commercially available from Hanse Chemie.

The preparation process for each of Sample Nos. 8-11 was as described above (except for Sample Nos. 10-11, where silica nanoparticles were added and Sample Nos. 8-10, where ATBN was added) as was the cure profile.

Sample Nos. 8-11 were cured and evaluated for property performance, results of which are shown below in Table 6.

TABLE 6

| Physical Properties | Sample No. | | | |
|---|---|---|---|---|
| | 8 | 9 | 10 | 11 |
| ΔH, J/g | −168 | −100 | −283 | −45 |
| Cured density | 1.09 | 1.08 | 1.18 | 0.99 |
| $T_g$, °C. | 197 | 204 | 199 | 232 |
| Hot/Wet $T_g$, °C. | 190 | 208 | 186 | 232 |
| Moisture uptake | 1.5 | 1.1 | 2.5 | 2.2 |
| Flexure modulus, GPa | 3.4 | 1.8 | 4.2 | 5.7 |

In comparing these results from Sample Nos. 8-11, it is clear that Tg increased with the addition of ATBN into the Bm-type benzoxazine. Also, fracture toughness in terms of $G_{IC}$ increased with increased amounts of ATBN. And, the comparison between Tg and Hot/Wet Tg of Sample Nos. 8-11 showed that there was not an appreciable difference in these values.

The advantages of using silica nanoparticles, for example, NANOPOX XP 0314 include the use of silica nanoparticles (contrasted with larger silica particles) allows for the inclusion of such silica nanoparticles in the composition even after filtration processes (used in prepreg or RTM), which would otherwise trap such larger particles.

What is claimed is:

1. A heat curable composition comprising:
   (a) a benzoxazine component comprising one or more of

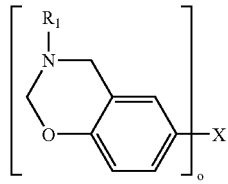

wherein o is 1-4, X is selected from the group consisting of the group consisting of a direct bond (when o is 2), alkyl (when o is 1), alkylene (when o is 2-4), carbonyl (when o is 2), thiol (when o is 1), thioether (when o is 2), sulfoxide (when o is 2), and sulfone (when o is 2), $R_1$ is selected from the group consisting of hydrogen, alkyl, and aryl, and $R_4$ is selected from hydrogen, halogen, alkyl, and alkenyl, or

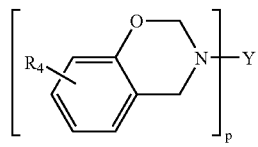

wherein p is 1-4, Y is selected from the group consisting of biphenyl (when p is 2), diphenyl methane (when p is 2) and derivatives thereof, diphenyl isopropane (when p is 2), diphenyl sulfide (when p is 2), diphenyl sulfoxide (when p is 2), diphenyl sulfone (when p is 2), and diphenyl kerone (when p is 2), and $R_4$ is selected from the group consisting of hydrogen, halogen, alkyl and alkenyl; and
   (b) a silica nanoparticle reinforced epoxy resin component, wherein said epoxy resin is selected from the group consisting of a cycloaliphatic epoxy resin matrix, a bisphenol A epoxy resin matrix, and a bisphenol F epoxy resin matrix; wherein said silica nanoparticle reinforced epoxy resin component is present in an amount of from 3 to 30% by weight of the total composition.

2. The heat curable composition of claim 1, wherein the benzoxazine component comprises one or more of

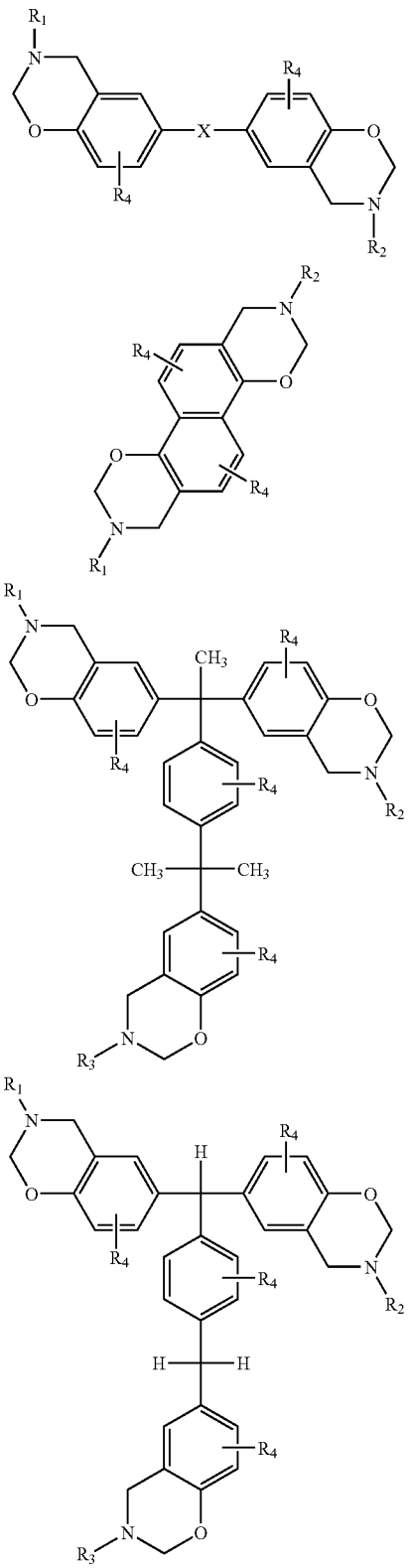

wherein X is selected from the group consisting of a direct bond, $CH_2$, $C(CH_3)_2$, C=O, S, S=O and O=S=O, and $R_1$, $R_2$, $R_3$ and $R_4$ are the same or different and are selected from the group consisting of hydrogen, alkyl, alkenyl and aryl.

3. The heat curable composition of claim 1, wherein the benzoxazine component comprises one or more of

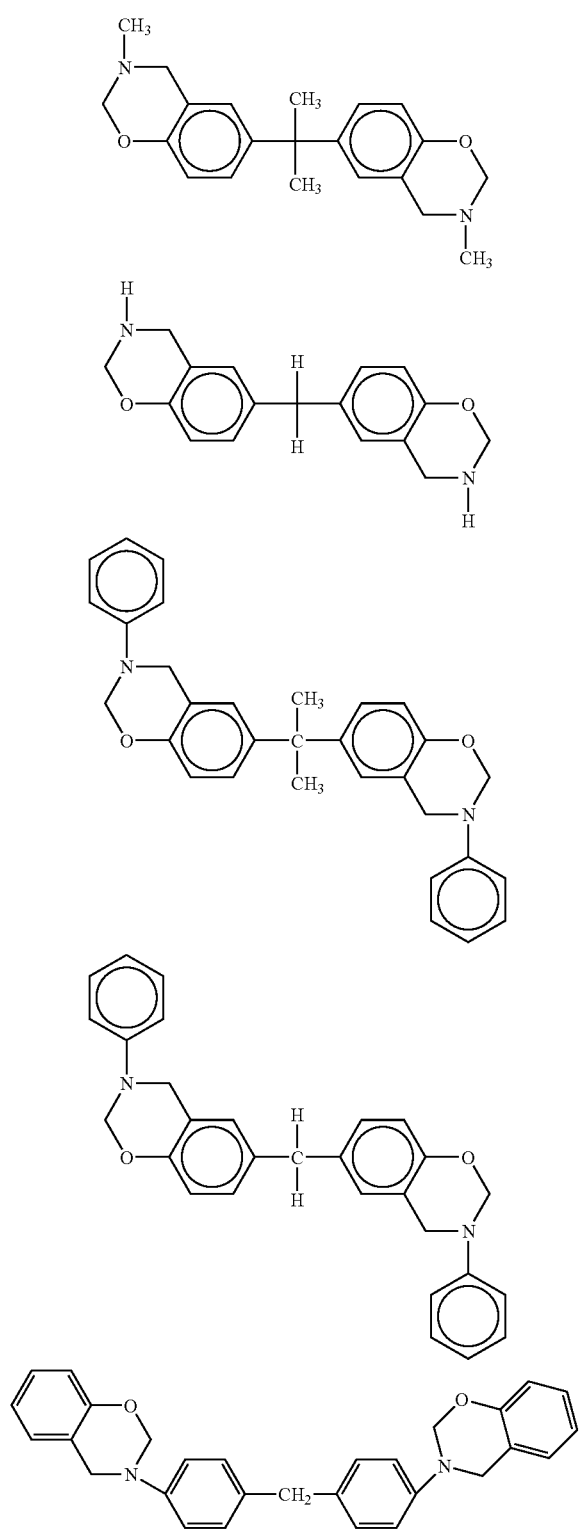

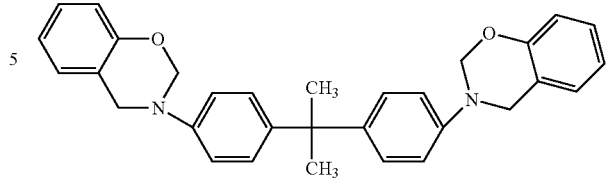

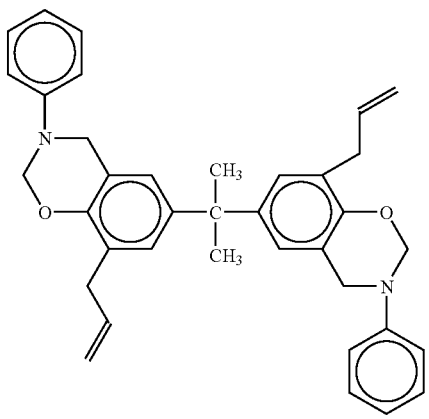

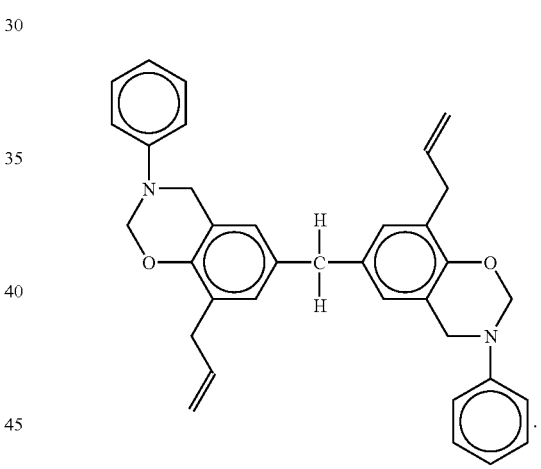

4. The heat curable composition of claim 1, wherein the benzoxazine component comprises

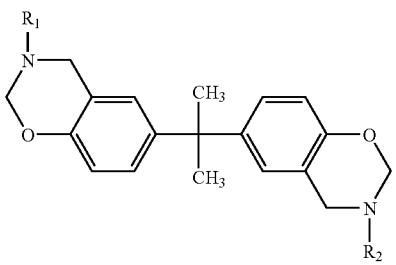

wherein $R_1$ and $R_2$ are the same or different and are selected from the group consisting of methyl, ethyl, propels and butyls.

5. The heat curable composition of claim 1, wherein the benzoxazine component is present in an amount in the range of about 10 to about 99 percent by weight, based on the total weight of the composition.

6. The heat curable composition of claim 1, wherein the silica component is present in an amount In the range of about 1 to about 60 percent by weight, based on the total weight of the composition.

7. An adhesive composition comprising the heat curable composition of claim 1.

8. The adhesive composition of claim 7, further comprising one or more of an adhesion promoter, a flame retardant, a filler, a thermoplastic material, a reactive or unreactive diluent, and a thixotrope.

9. Cured reaction products of the adhesive composition of claim 7.

10. An adhesive film comprising the heat curable composition of claim 1.

11. The adhesive film of claim 10, further comprising a support selected from the group consisting of nylon, glass, carbon, polyester, polyalkylene, quartz, polybenzimidazole, polyetheretherketone, polyphenylene sulfide, poly p-phenylene benzobisoxazole and silicon carbide.

12. Cured reaction product of the adhesive film of claim 11.

13. A syntactic composition comprising the heat curable composition:

(a) a benzoxazine component comprising one or more of

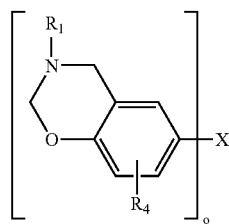

wherein o is 1-4, X is selected from the group consisting of the group consisting of a direct bond (when o is 2), alkyl (when o is 1), alkylene (when o is 2-4), carbonyl (when o is 2), thiol (when o is 1), thioether (when o is 2), sulfoxide (when o is 2), and sulfone (when o is 2), $R_1$ is selected from the group consisting of hydrogen, alkyl, and aryl, and $R_4$ is selected from hydrogen, halogen, alkyl, and alkenyl, or

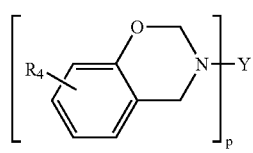

wherein p is 1-4, Y is selected from the group consisting of biphenyl (when p is 2), diphenyl methane (when p is 2) and derivatives thereof, diphenyl isopropane (when p is 2), diphenyl sulfide (when p is 2), diphenyl sulfoxide (when p is 2), diphenyl sulfone (when p is 2), and diphenyl ketone (when p is 2), and $R_4$ is selected from the group consisting of hydrogen, halogen, alkyl and alkenyl; and (b) a silica nanoparticle reinforced epoxy resin component, wherein said epoxy resin is selected from the group consisting of a cycloaliphatic epoxy resin matrix, a bisphenol A epoxy resin matrix, and a bisphenol F epoxy resin matrix; wherein said silica nanoparticle reinforced epoxy resin component is present in an amount of from 3 to 30% by weight of the total composition.

14. A prepreg comprising the heat curable composition of claim 1.

15. A towpreg comprising the heat curable composition of claim 1.

16. A process for producing a heat curable composition, steps of which comprise:

(a) providing a benzoxazine composition comprising

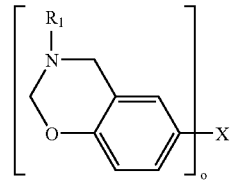

wherein o is 1-4, X is selected from the group consisting of the group consisting of a direct bond (when o is 2), alkyl (when o is 1), alkylene (when o is 2-4), carbonyl (when o is 2), thiol (when o is 1) thioether (when o is 2), sulfoxide (when o is 2), and sulfone (when o is 2), $R_1$ is selected from the group consisting of hydrogen, alkyl, and aryl, and $R_4$ is selected from the group consisring of hydrogen, halogen, alkyl, and alkenyl, or

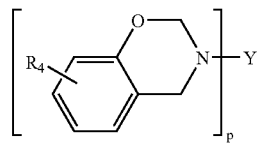

wherein p is 1-4, Y is selected from the group consisting of biphenyl (when p is 2), diphenyl methane (when p is 2) and derivatives thereof, diphenyl isopropane (when p is 2), diphenyl sulfide (when p is 2), diphenyl sulfoxide(when p is 2), diphenyl sulfone (when p is 2), and diphenyl ketone (when p is 2), and $R_4$ is selected from the group consisting of hydrogen, halogen, alkyl and alkenyl; and (b) providing with mixing a silica nanoparticle reinforced epoxy resin component, wherein said epoxy resin is selected from the group consisting of a cycloaliphatic epoxy resin matrix, a bisphenol A epoxy resin matrix, and a bisphenol F epoxy resin matrix; and wherein said silica nanoparricles are pre-dispersed in the epoxy resin; and (c) mixing the benzoxazine composition of (a) and the silica component of (b) under conditions appropriate to produce the heat curable composition.

17. The composition according to claim 1, further comprising (c) a cycloaliphatic epoxy.
18. The composition according to claim 17, further comprising (d) a component containing the structure:
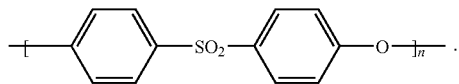
19. The process according to claim 16, wherein the benzoxazine composition further comprises a cycloaliphatic epoxy and a component containing the structure:
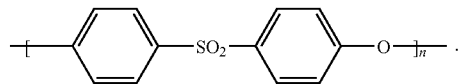
* * * * *